(12) United States Patent
Shuto

(10) Patent No.: US 10,494,047 B2
(45) Date of Patent: Dec. 3, 2019

(54) SADDLE-RIDING-TYPE VEHICLE CABLE SUPPORT STRUCTURE

(71) Applicant: HONDA MOTOR CO., LTD., Tokyo (JP)

(72) Inventor: Kenta Shuto, Tokorozawa (JP)

(73) Assignee: HONDA MOTOR CO., LTD., Tokyo (JP)

( * ) Notice: Subject to any disclaimer, the term of this patent is extended or adjusted under 35 U.S.C. 154(b) by 66 days.

(21) Appl. No.: 15/467,518

(22) Filed: Mar. 23, 2017

(65) Prior Publication Data

US 2017/0274955 A1 Sep. 28, 2017

(30) Foreign Application Priority Data

Mar. 28, 2016 (JP) .................................. 2016-063562

(51) Int. Cl.
| | | |
|---|---|---|
| *B60T 17/04* | (2006.01) | |
| *B62K 19/38* | (2006.01) | |
| *B62J 99/00* | (2009.01) | |
| *F16B 2/20* | (2006.01) | |
| *F16L 3/237* | (2006.01) | |
| *B62K 11/04* | (2006.01) | |
| *B62K 21/02* | (2006.01) | |
| *B62L 5/00* | (2006.01) | |

(52) U.S. Cl.
CPC .................. *B62J 99/00* (2013.01); *F16B 2/20* (2013.01); *F16L 3/237* (2013.01); *B62J 2099/002* (2013.01); *B62K 11/04* (2013.01); *B62K 21/02* (2013.01); *B62L 5/006* (2013.01)

(58) Field of Classification Search
CPC ...... B62K 19/38; B60T 8/3685; B60T 8/1706; B60T 8/261; B60T 8/3225; B60T 17/046
USPC ......................................................... 180/219
See application file for complete search history.

(56) References Cited

U.S. PATENT DOCUMENTS

| | | | |
|---|---|---|---|
| 7,918,301 B2 * | 4/2011 | Ito .......................... | B62K 11/04 180/219 |
| 2005/0082821 A1 * | 4/2005 | Fujita .................... | B60T 17/046 285/62 |

(Continued)

FOREIGN PATENT DOCUMENTS

| | | | | |
|---|---|---|---|---|
| EP | 2962924 A1 * | 1/2016 | ............. | B62K 19/38 |
| JP | 2011-168143 A | 9/2011 | | |

(Continued)

OTHER PUBLICATIONS

Japanese Notice of Reasons for Rejection for Japanese Application No. 2016-063562, dated Oct. 3, 2017, with an English translation.

(Continued)

*Primary Examiner* — Bradley T King
*Assistant Examiner* — Stephen M Bowes
(74) *Attorney, Agent, or Firm* — Birch, Stewart, Kolasch & Birch, LLP

(57) ABSTRACT

A saddle-riding-type vehicle cable support structure is a cable support structure configured to support a first cable and a second cable that are joined to a side part of a wheel, the cable support structure including: a joint section provided on a middle of the first cable and which is fixed to a vehicle body; and a second cable support member attached to the joint section and which supports the second cable.

4 Claims, 6 Drawing Sheets

(56) References Cited

U.S. PATENT DOCUMENTS

| | | | | |
|---|---|---|---|---|
| 2007/0199757 A1* | 8/2007 | Toyoda | ................ | B60T 17/046 180/227 |
| 2009/0243377 A1* | 10/2009 | Kofuji | ................. | B60G 17/027 303/9.64 |
| 2013/0009378 A1* | 1/2013 | Nagakubo | ............. | B60T 8/1706 280/274 |
| 2015/0076790 A1* | 3/2015 | Sugimoto | .............. | B62K 19/38 280/283 |

FOREIGN PATENT DOCUMENTS

| | | |
|---|---|---|
| JP | 2011-195023 A | 10/2011 |
| JP | 2011-195024 A | 10/2011 |
| JP | 2013-184607 A | 9/2013 |
| JP | 2014-15134 A | 1/2014 |
| JP | 2014-34339 A | 2/2014 |
| JP | 2014-40124 A | 3/2014 |
| JP | 2014-97682 A | 5/2014 |
| JP | 2015-77934 A | 4/2015 |

OTHER PUBLICATIONS

Extended European Search Report for European Application No. 17161844.0, dated Aug. 31, 2017.

* cited by examiner

US 10,494,047 B2

SADDLE-RIDING-TYPE VEHICLE CABLE SUPPORT STRUCTURE

CROSS-REFERENCE TO RELATED APPLICATION

Priority is claimed on Japanese Patent Application No. 2016-063562, filed on Mar. 28, 2016, the contents of which are incorporated herein by reference.

BACKGROUND

Field of the Invention

The present invention relates to a saddle-riding-type vehicle cable support structure.

Background

In the related art, for example, a support structure of a cable for a saddle riding type vehicle is disclosed in Japanese Unexamined Patent Application, First Publication No. 2014-34339 and Japanese Unexamined Patent Application, First Publication No. 2014-40124. These saddle-riding-type vehicle cable support structures are structures in which a brake hose and a sensor cable are fixed by a dedicated clasp (clamp member).

SUMMARY

However, when the brake hose and the sensor cable are fixed by the dedicated clasp, the number of components is increased, and therefore, costs may be increased.

An object of an aspect of the present invention is to reduce the number of components and reduce costs in a saddle-riding-type vehicle cable support structure.

(1) A saddle-riding-type vehicle cable support structure according to an aspect of the present invention is a cable support structure configured to support a first cable and a second cable that are joined to a side part of a wheel, the cable support structure including: a joint section provided on a middle of the first cable and which is fixed to a vehicle body; and a second cable support member attached to the joint section and which supports the second cable.

(2) In the above saddle-riding-type vehicle cable support structure, a junction unit that joins together part of the joint section and part of the second cable support member in an overlapped state may be provided between the joint section and the second cable support member.

(3) In the above saddle-riding-type vehicle cable support structure, the second cable support member may include an extension section that extends such that the second cable is interposed between the second cable support member and the vehicle body.

(4) In the above saddle-riding-type vehicle cable support structure, the second cable support member may include a clip attachment section to which a clip that supports the second cable is attached.

(5) In the above saddle-riding-type vehicle cable support structure, the joint section may be fixed to a stay that is formed integrally with a front fork.

(6) In the above saddle-riding-type vehicle cable support structure, the first cable may be a brake hose that connects a brake caliper which is provided at a side part of the wheel and a fluid pressure supply unit or an ABS module, and the second cable may be a sensor cord that is connected to a vehicle speed sensor which is provided at a side part of the wheel.

(7) In the above saddle-riding-type vehicle cable support structure, the brake caliper may include a first brake caliper that is provided on one side of the wheel in a vehicle width direction and a second brake caliper that is provided on the other side of the wheel in the vehicle width direction; the brake hose may include a first brake hose that connects the first brake caliper and the fluid pressure supply unit or the ABS module and a second brake hose that connects the first brake caliper and the second brake caliper; the joint section may include a first joint section that is provided on a middle of the first brake hose and a second joint section that is provided on a middle of the second brake hose; the second cable support member may be attached to any one of the first joint section and the second joint section; and a fixation member that fixes the first joint section and the second joint section in a state where the first joint section is in contact with the second joint section may be further provided.

According to the above configuration (1), the joint section provided on the middle of the first cable and which is fixed to the vehicle body and the second cable support member attached to the joint section and which supports the second cable are provided, and thereby, it is unnecessary to provide a dedicated clasp for supporting the first cable and the second cable. Accordingly, it is possible to reduce the number of components and reduce costs.

According to the above configuration (2), the junction unit that joins part of the joint section and part of the second cable support member in an overlapped state is provided between the joint section and the second cable support member. Thereby, the joint section and the second cable support member are partially overlapped with each other, and therefore, it is possible to ensure high rigidity.

According to the above configuration (3), the second cable support member includes the extension section that extends such that the second cable is interposed between the second cable support member and the vehicle body. Thereby, the second cable can be always supported in a state where the second cable is in contact with the vehicle body, and therefore, it is possible to prevent being subject to the effect such as vibration during traveling.

According to the above configuration (4), the second cable support member includes the clip attachment section to which the clip that supports the second cable is attached, and thereby, it is possible to support the second cable stably by the clip.

According to the above configuration (5), the joint section is fixed to the stay that is formed integrally with the front fork. Thereby, the joint section is connected with high rigidity, and therefore, it is possible to prevent being subject to the effect such as vibration during traveling. Further, the unity of the joint section and the front fork is caused to emerge, and therefore, it is possible to improve the appearance.

According to the above configuration (6), the first cable is the brake hose that connects the brake caliper which is provided at the side part of the wheel and the fluid pressure supply unit or the ABS module, and the second cable is the sensor cord that is connected to the vehicle speed sensor which is provided at the side part of the wheel to thereby provide the following advantages. The second cable support member that supports the sensor cord is attached to the joint section having higher rigidity than the brake hose, and thereby, it is possible to further reliably support the sensor cord.

According to the above configuration (7), the fixation member that fixes the first joint section and the second joint section in a state where the first joint section is in contact with the second joint section is further provided. Thereby, it is possible to ensure high rigidity, and therefore, it is possible to prevent being subject to the effect such as vibration during traveling. Additionally, two brake hoses are simultaneously fixed collectively, and therefore, it is possible to improve the appearance.

DESCRIPTION OF THE EMBODIMENTS

Figure 1:
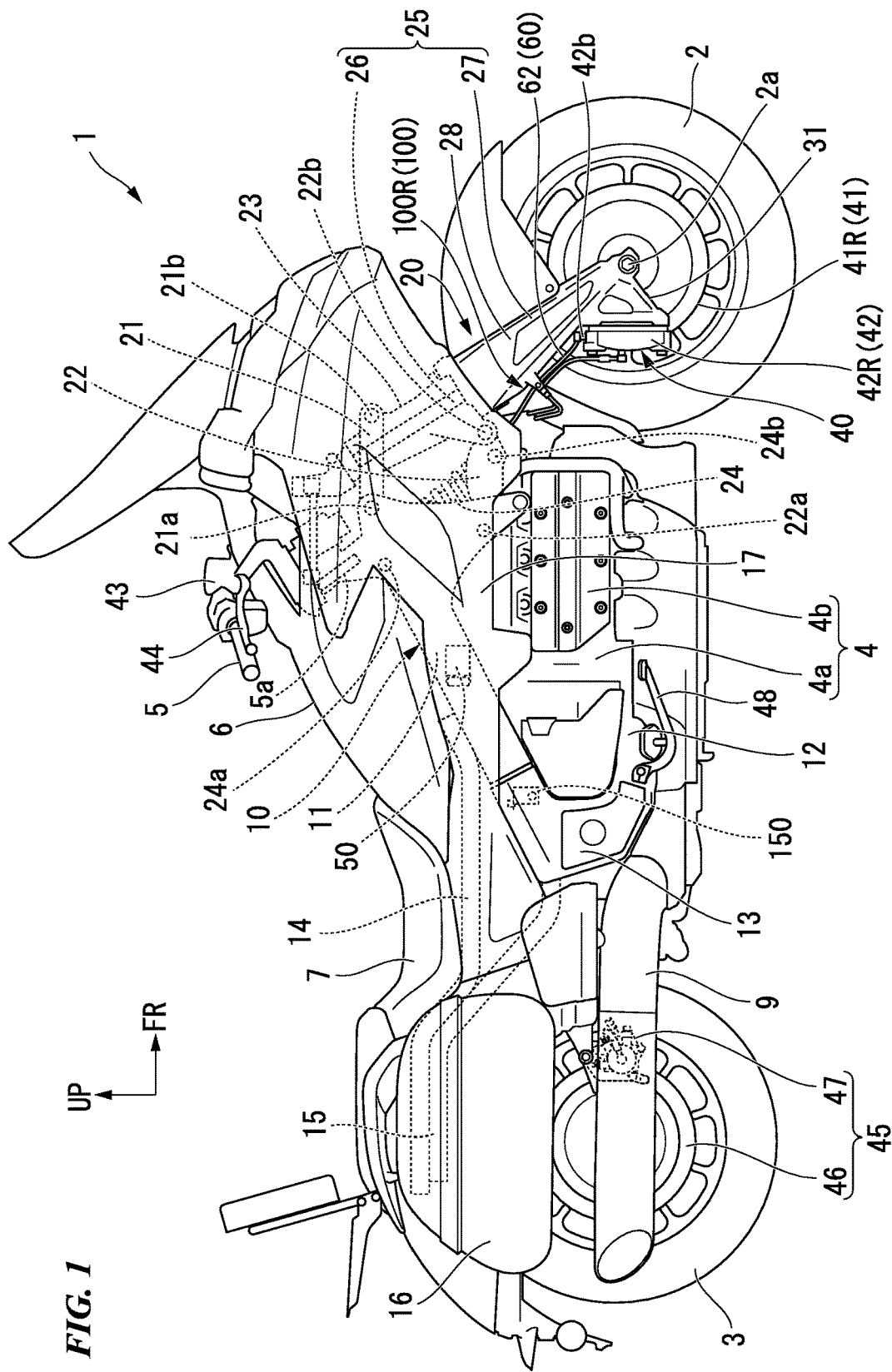
FIG. 1 is a right side view of a motorcycle in an embodiment of the present invention.

Hereinafter, embodiments of the present invention will be described with reference to the drawings. Note that, front, rear, right, and left directions in the following description are the same as front, rear, right, and left directions of a vehicle described below if there is no particular description. In addition, in the drawings referred to in the following description, an arrow FR that indicates the front of the vehicle, an arrow LH that indicates the left of the vehicle, and an arrow UP that indicates the upside of the vehicle are shown.

<Entire Vehicle>

FIG. 1 shows a large-size motorcycle 1 that includes a horizontally-opposed six-cylinder engine 4 between a front wheel 2 and a rear wheel 3 as an example of a saddle riding type vehicle. Hereinafter, the motorcycle may be simply referred to as a "vehicle".

The engine 4 is supported by a vehicle body frame 10. The vehicle body frame 10 includes a main frame 11 that rotatably supports a handle steering shaft 5a which is rotated by a handle 5, a lower frame 12 that is attached to a front lower part of the main frame 11 and extends in a front-to-rear direction below the main frame 11, a pair of right and left pivot plates 13 that extend in a vertical direction to bridge a gap between a rear end part of the main frame 11 and a rear end part of the lower frame 12, a pair of right and left seat rails 14 that extend rearward from a rear end part of the main frame 11, and a pair of right and left sub frames 15 that extend rearward and upward from the pivot plate 13 and is joined to a rear end part of the seat rail 14.

The engine 4 is arranged below the main frame 11. The engine 4 is supported by the main frame 11 and the lower frame 12. The engine 4 includes a crankcase 4a, a right cylinder 4b that protrudes right from the crankcase 4a, and a left cylinder 4b that protrudes left from the crankcase 4a. Three cylinder bores are formed to be aligned in the front-to-rear direction on each of the right and left cylinders 4b, and a piston is inserted slidably in each cylinder bore.

A fuel tank 6 is arranged above the main frame 11. The fuel tank 6 extends rearward and downward from the front direction along the slant of the main frame 11. The fuel tank 6 is supported by the main frame 11. A seat 7 on which an occupant is seated is arranged at a rearward position of the fuel tank 6. The seat 7 is supported by a seat rail 14.

Figure 2:
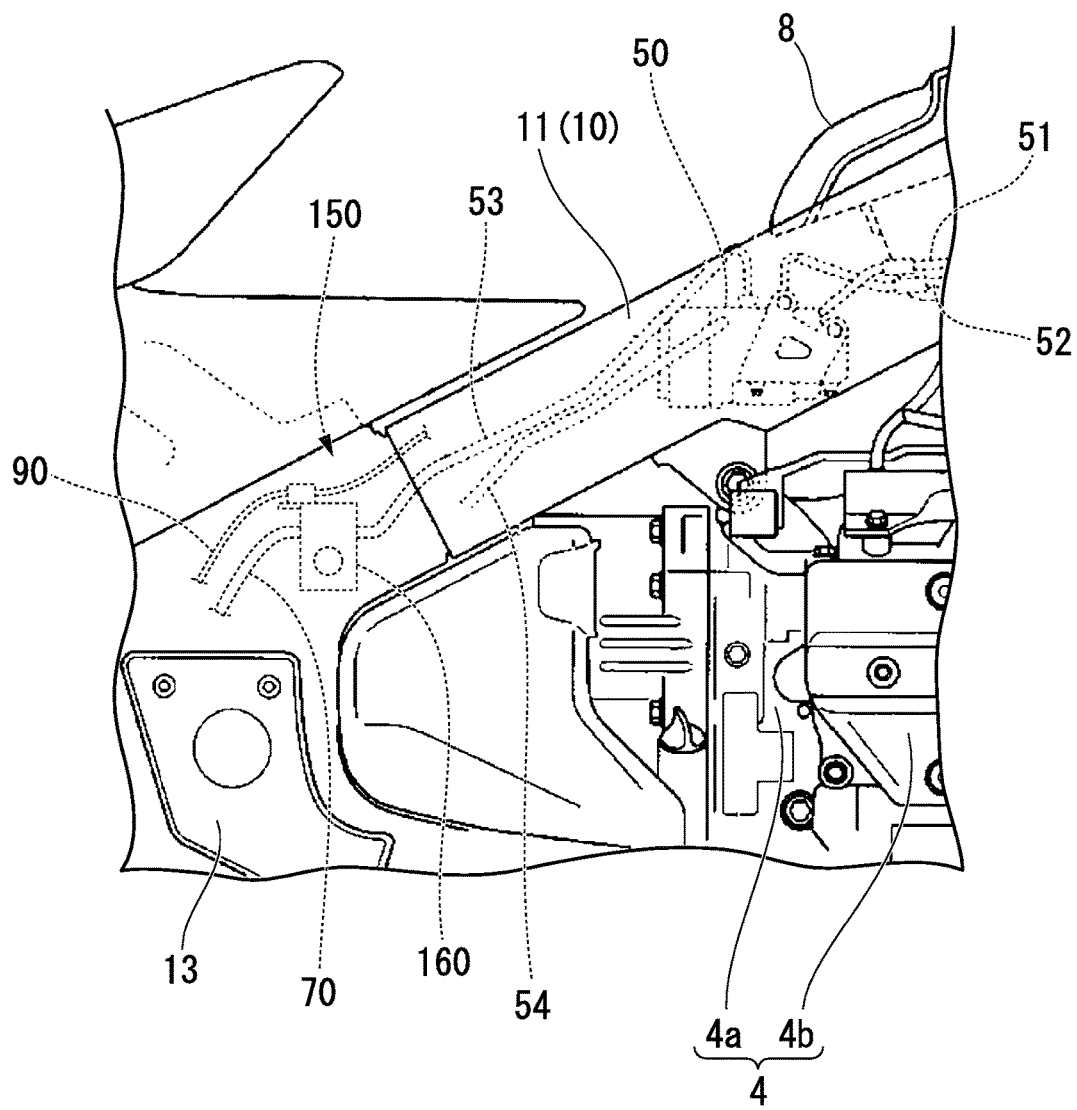
FIG. 2 is an enlarged view of a main part of FIG. 1.

FIG. 2 is an enlarged view of a main part of FIG. 1. FIG. 2 shows a state in which the fuel tank 6 and the like are detached in the motorcycle 1. As shown in FIG. 2, an air cleaner box 8 is arranged above the engine 4 between the right and left main frames 11 in the vehicle width direction.

Although not shown in the drawings, a front end part of a rear swing arm that extends in the front-to-rear direction is rotatably supported by the pivot plate 13. The rear swing arm is swingable in the vertical direction. As shown in FIG. 1, the rear wheel 3 is supported by a rear end part of the rear swing arm. A vehicle lower part side of the rear swing arm is arranged on an inner side in the vehicle width direction of an exhaust muffler 9 that extends in the front-to-rear direction. A right trunk 16 is provided on a right side of the rear wheel 3. A left trunk 16 is provided on a left side of the rear wheel 3. The upper part of the right and left cylinders 4b is covered by a front side cowl 17 from the outside in the vehicle width direction.

<Front Suspension Mechanism>

As shown in FIG. 1, a front suspension mechanism 20 is supported by a front part of the main frame 11. The front suspension mechanism 20 includes an upper link 21, a lower link 22, a fork support unit 23, a front cushion unit 24, and a front swing arm 25.

The upper link 21 and the lower link 22 are arranged on a front part of the main frame 11 so as to have an interval in the vertical direction. The upper link 21 is supported swingably upward and downward via a support shaft 21a by a front part of the main frame 11. The lower link 22 is supported swingably upward and downward via a support shaft 22a by a front part of the main frame 11. The upper link 21 and the lower link 22 are arranged so as to extend in the front-to-rear direction and be substantially parallel with each other.

The fork support unit 23 forms a cylindrical shape and is slanted rearward. A front end part of the upper link 21 is rotatably connected via a support shaft 21b to an upper front part of the fork support unit 23.

A front end part of the lower link 22 is rotatably connected via a support shaft 22b to a lower rear part of the fork support unit 23.

An upper end part of the front cushion unit 24 is swingably supported via a support shaft 24a by the main frame 11. A lower end part of the front cushion unit 24 is swingably supported via a support shaft 24b by the lower link 22.

<Front Swing Arm>

Figure 3:
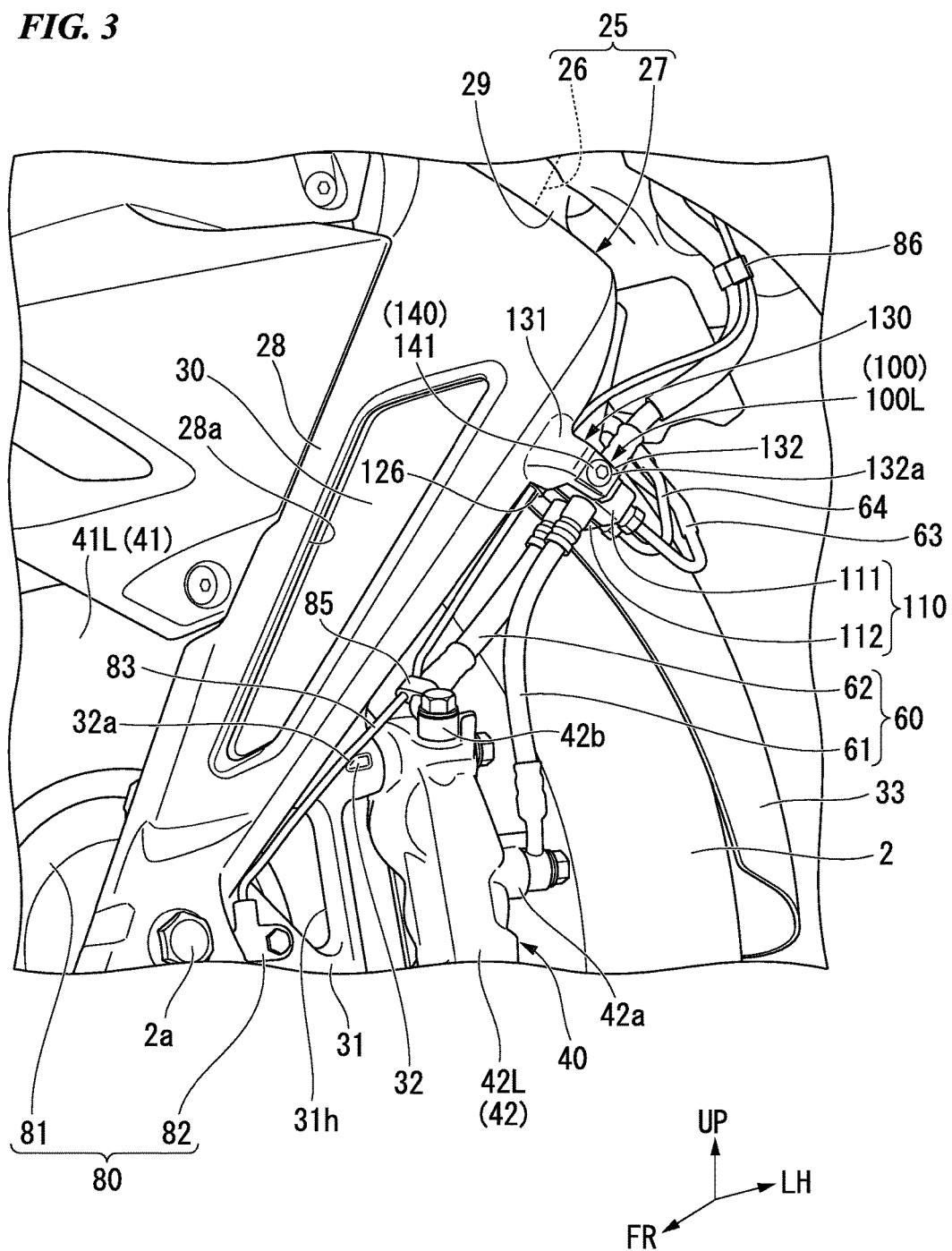
FIG. 3 is a perspective view of a front cable support structure of the motorcycle when seen from a left front direction.

With reference to both FIG. 1 and FIG. 3, the front swing arm 25 is arranged so as to be slanted rearward. The front swing arm 25 includes a front wheel steering shaft 26 that is rotatably supported by the fork support unit 23 and a fork unit 27 that is joined integrally to a lower end part of the front wheel steering shaft 26.

The front wheel steering shaft 26 is inserted in a fork shaft insertion hole that is formed on the fork support unit 23. The front wheel steering shaft 26 is rotatably supported by the fork support unit 23 in a state where the front wheel steering shaft 26 is inserted in the fork shaft insertion hole.

The fork unit 27 includes a pair of right and left arm sections 28 that extend in the vertical direction so as to be slanted rearward and a bridge section 29 that integrally connects upper end parts of the right and left arm sections 28.

A front wheel axle 2a that rotatably supports the front wheel 2 is attached to lower end parts of the right and left arm sections 28. A lower end part of the front wheel steering shaft 26 is attached to the bridge section 29.

The arm section 28 is formed in a taper shape such that the lower end part is tapered. The arm section 28 has a hollow structure (refer to FIG. 5). A recess section 28a having a parallelogram shape is formed on an outer circumferential surface of the arm section 28 so as to extend along a longitudinal direction of the arm section 28. A reflector 30 as a reflection plate that reflects light from a vehicle side direction is fitted to the recess section 28a. The reflector 30 has an external shape that is similar to the outline of the recess section 28a.

A caliper support portion 31 is provided at a rear position of a lower end part of the arm section 28. In a side view, the caliper support portion 31 forms a triangular shape. An opening 31h that opens in the vehicle width direction is formed on the caliper support portion 31. A protrusion section 32 that protrudes outward in the vehicle width direction and forms a trapezoidal shape in a side view is provided on the caliper support portion 31 of the left arm section 28. The protrusion section 32 is formed integrally with the caliper support portion 31. The protrusion section 32 has a slant surface 32a along the arm section 28 and which supports a front wheel sensor cord 83. A front fender 33 that covers the upper part of the front wheel 2 is attached to the arm section 28.

<Front Brake Device>

A disk-type front brake device 40 is provided on a side of the front wheel 2. The front brake device 40 includes a front disk brake 41 provided on an outer circumferential side of a hub of the front wheel 2 and which is rotated integrally with the front wheel 2 and a front brake caliper 42 which gives a friction force to the front disk brake 41 at the time of braking (that is, gives a braking force to the front wheel 2 by sandwiching the front disk brake 41).

The front disk brake 41 includes a first front disk brake 41L attached to one side part (left side part) of the hub of the front wheel 2 in the vehicle width direction and which has a annular shape and a second front disk brake 41R attached to the other side part (right side part) of the hub of the front wheel 2 in the vehicle width direction and which has a annular shape. The first front disk brake 41L and the second front disk brake 41R are arranged concentrically with the front wheel 2.

The front brake caliper 42 includes a first front brake caliper 42L supported by one side part (specifically, the caliper support portion 31 of the left arm section 28) of the front wheel 2 in the vehicle width direction and a second front brake caliper 42R supported by the other side part (specifically, the caliper support portion 31 of the right arm section 28) of the front wheel 2 in the vehicle width direction.

<Rear Brake Device>

As shown in FIG. 1, a disk-type rear brake device 45 is provided on a side of the rear wheel 3. The rear brake device 45 includes a rear disk brake 46 provided on an outer circumferential side of a hub of the rear wheel 3, having an annular shape, and which is rotated integrally with the rear wheel 3 and a rear brake caliper 47 which gives a friction force to the rear disk brake 46 at the time of braking (that is, gives a braking force to the rear wheel 3 by sandwiching the rear disk brake 46).

The rear disk brake 46 is attached to a right side part of the hub of the rear wheel 3 in the vehicle width direction. The rear brake caliper 47 is supported by a rear end part of the rear swing arm (not shown).

<Master Cylinder>

As shown in FIG. 1, a front wheel master cylinder 43 that supplies a hydraulic pressure (brake pressure) for sandwiching to the front brake caliper 42 is provided on the handle 5. A brake lever 44 is supported swingably by the handle 5. The front wheel master cylinder 43 supplies the brake pressure to the front brake caliper 42 in response to the operation of the brake lever 44.

Although not shown in the drawings, a rear wheel master cylinder that supplies a hydraulic pressure (brake pressure) for sandwiching to the rear brake caliper 47 is provided on the right pivot plate 13. A brake pedal 48 is supported swingably by the right pivot plate 13. The rear wheel master cylinder supplies the brake pressure to the rear brake caliper 47 in response to the operation of the brake pedal 48.

<ABS (Antilock Brake System) Module>

With reference to both FIG. 1 and FIG. 2, an ABS module 50 is provided between the right and left main frames 11 in the vehicle width direction. The front wheel master cylinder 43 supplies a brake pressure via the ABS module 50 to the front brake caliper 42. The rear wheel master cylinder (not shown) supplies a brake pressure via the ABS module 50 to the rear brake caliper 47. That is, in the motorcycle 1, the ABS module 50 is provided on a middle of a piping that connects the front brake caliper 42 and the front wheel master cylinder 43. The ABS module 50 is positioned at a middle of a piping that connects the rear brake caliper 47 and the rear wheel master cylinder (not shown).

When slipping (locking) is detected at the time of braking of the front wheel 2 and the rear wheel 3, the ABS module 50 is capable of reducing the brake pressure to the front brake caliper 42 and the rear brake caliper 47 in order to avoid the slipping. For example, when the slipping (locking) is detected, the ABS module 50 performs a control such that the brake pressure to the front brake caliper 42 and the rear brake caliper 47 becomes intermittent.

The ABS module 50 is arranged above the engine 4 and at a rearward position of the air cleaner box 8. In a side view, the ABS module 50 is arranged with a predetermined interval above the right and left cylinders 4b of the engine 4. The ABS module 50 is supported by an inner side part in the vehicle width direction of the main frame 11 via a bracket (not shown).

Although not shown in the drawings, the ABS module 50 includes an electronic control unit, a hydraulic circuit unit, and an electrically-driven motor. For example, in the ABS module 50, when the slipping (locking) is detected, a pressure reduction control signal is input to the electronic control unit, and the electronic control unit drives the electrically-driven motor to control a valve in the hydraulic circuit unit to thereby perform a control such that the brake pressure is reduced and becomes intermittent.

A front wheel upstream piping 51, a front wheel downstream piping 52, a rear wheel upstream piping 53, and a rear wheel downstream piping 54 are joined to the ABS module 50.

The front wheel upstream piping 51 extends frontward between the right and left main frames 11 in the vehicle width direction and is joined to the front wheel master cylinder 43 provided on the handle 5.

The front wheel downstream piping 52 extends frontward between the right and left main frames 11 in the vehicle width direction and is joined to the front brake caliper 42 via a front brake hose 60.

The rear wheel upstream piping 53 extends rearward and downward between the right and left main frames 11 in the vehicle width direction and is joined via a rear brake hose 70 to the rear wheel master cylinder (not shown) arranged at a vehicle lower part.

The rear wheel downstream piping 54 extends rearward and downward between the right and left main frames 11 in the vehicle width direction and is joined to the rear brake caliper 47.

<Front Brake Hose>

With reference to FIG. 1 to FIG. 3, the front brake hose 60 includes a first front brake hose 61 that connects the first front brake caliper 42L and the ABS module 50 via the front wheel downstream piping 52 and a second front brake hose 62 that connects the first front brake caliper 42L and the second front brake caliper 42R. In the drawings, reference numeral 63 represents a first front brake pipe, and reference numeral 64 represents a second front brake pipe.

One end part (lower end part) of the first front brake hose 61 is joined to a first joint part 42a positioned at a rear end part of the first front brake caliper 42L. After extending upward from the first joint part 42a toward the left arm section 28, the first front brake hose 61 is curved rearward and upward to extend along the left arm section 28 and is curved in the vicinity beyond the front fender 33 to extend toward the vehicle body frame 10 (for example, the main frame 11).

One end part (left lower end part) of the second front brake hose 62 is attached to a second joint part 42b positioned at an upper end part of the first front brake caliper 42L. After extending along the left arm section 28 from the second joint part 42b (that is, the second joint part 42b on the left side) of the first front brake caliper 42L, the second front brake hose 62 extends rearward and downward at a position overlapped with the front fender 33 and extends rightward in the vehicle width direction so as to straddle the front fender 33. Then, as shown in FIG. 1, the second front brake hose 62 extends frontward and upward at a position overlapped with the front fender 33 in a right side view of FIG. 1 and extends frontward and downward along the left arm section 28 to then arrive at the second joint part 42b (that is, the second joint part 42b on the right side) of the second front brake caliper 42R.

The first front brake pipe 63 straddles the front fender 33 and extends in the vehicle width direction so as to connect a first front joint section 111 provided on one side (left side) of the front wheel in the vehicle width direction and a first front joint section (not shown) provided on the other side (right side) of the front wheel in the vehicle width direction. The second front brake pipe 64 straddles the front fender 33 and extends in the vehicle width direction so as to connect a second front joint section 112 provided on one side (left side) of the front wheel in the vehicle width direction and a second front joint section (not shown) provided on the other side (right side) of the front wheel in the vehicle width direction. That is, the second front brake pipe 64 and the right and left second front joint sections are provided on a middle of the second front brake hose 62.

<Wheel Speed Detection Device>

As shown in FIG. 3, a wheel speed detection device 80 that detects the rotation speed of the front wheel 2 is provided on a side of the front wheel 2. The wheel speed detection device 80 includes a pulsar ring 81 having an annular shape and which rotates integrally with the front wheel 2 and a pickup sensor 82 that detects the rotation of the pulsar ring 81.

The pulsar ring 81 is attached to one side part (left side part) of the hub of the front wheel in the vehicle width direction. The pulsar ring 81 is arranged on the left side in the vehicle width direction of the first front disk brake 41L. The pulsar ring 81 is arranged on the inner side in the radial direction of the first front disk brake 41L. The pulsar ring 81 is arranged concentrically with the front wheel 2. Although not shown in the drawings, a plurality of pickup holes are formed on the pulsar ring 81 with substantially the same interval in the circumferential direction.

The pickup sensor 82 is supported by the caliper support portion 31 of the left arm section 28.

The pickup sensor 82 includes a pickup coil (not shown) that generates a pulse signal by a magnetic flux change which accompanies the rotation of the pulsar ring 81. One end part (lower end part) of the front wheel sensor cord 83 is joined to the pickup sensor 82. The other end part of the front wheel sensor cord 83 is joined to a control unit (not shown). Thereby, the pulse signal generated by the pickup coil is output to the control unit. For example, the pulse signal is used for detection of a slip ratio of the front wheel 2, detection of the vehicle speed, and the like.

The front wheel sensor cord 83 extends along the left arm section 28 from the pickup sensor 82 and is then supported by the slant surface 32a of the protrusion section 32. Then, the front wheel sensor cord 83 together with one end part (lower end part on the left side) of the second front brake hose 62 is supported by a first clamp 85. Then, the front wheel sensor cord 83 extends along the left arm section 28 and is then interposed between the front wheel stay 130 and an extension section 122 (refer to FIG. 4) of a front wheel cord support member 120 at the inner side in the vehicle width direction of the front wheel stay 130 described below. Then, the front wheel sensor cord 83 extends while being curved rearward and upward in the vicinity beyond the front fender 33 and is then curved to extend frontward and upward along the first front brake hose 61 to be supported together with the first front brake hose 61 by a second clamp 86. Then, the front wheel sensor cord 83 extends toward the control unit (not shown).

<Front Cable Support Structure>

With reference to both FIG. 1 and FIG. 2, a front cable support structure 100 includes a first front cable support structure 100L that is provided on one side (left side) of the front wheel in the vehicle width direction and a second front cable support structure 100R that is provided on the other side (right side) of the front wheel in the vehicle width direction. Hereinafter, the first front cable support structure 100L is mainly described. The second front cable support structure 100R has a configuration similar to the first front cable support structure 100L, and therefore, a detailed description of the second front cable support structure 100R is omitted.

Figure 4:
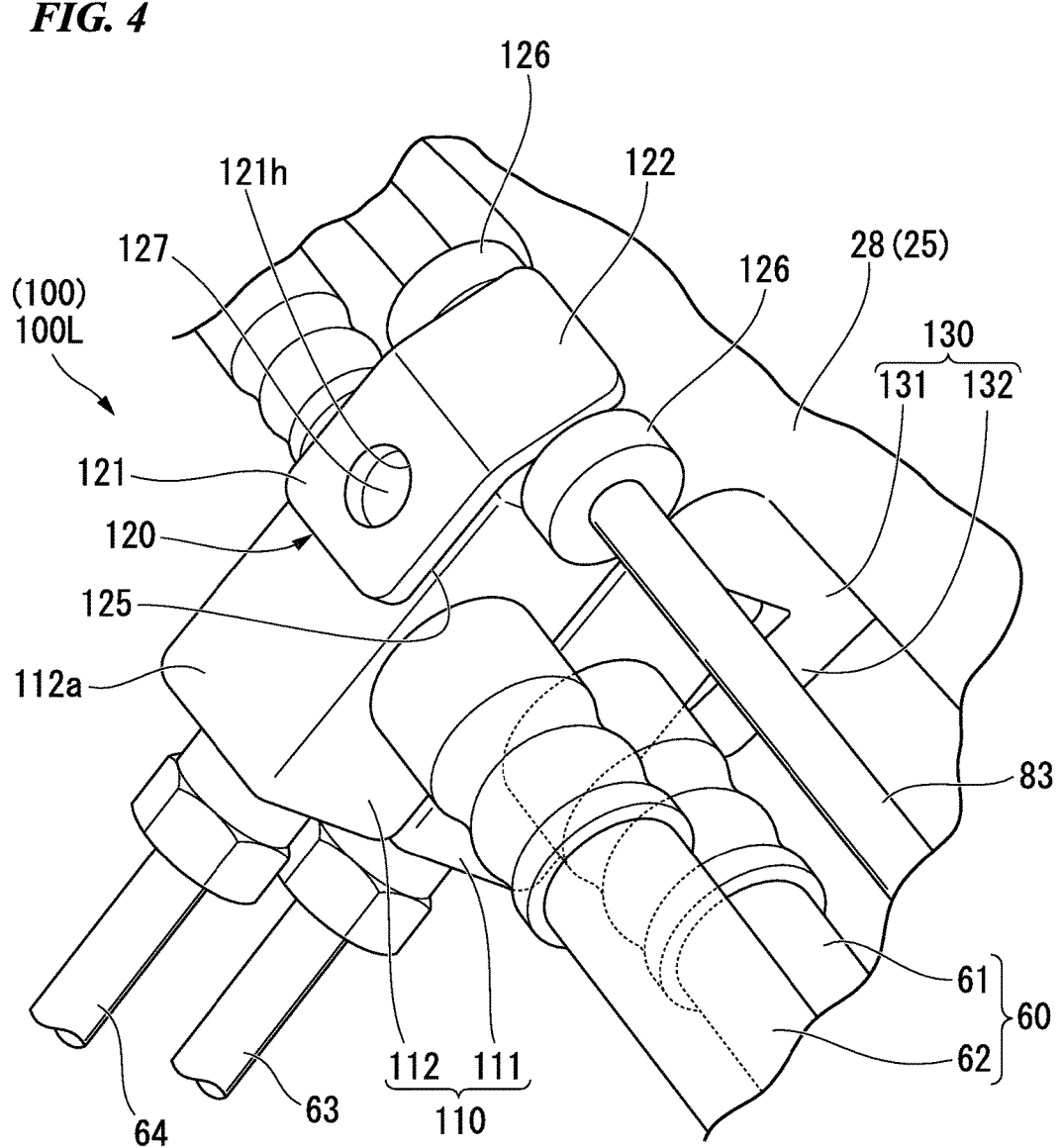
FIG. 4 is a perspective view of the front cable support structure when seen from a right front direction.

With reference to both FIG. 3 and FIG. 4, the first front cable support structure 100L includes a front joint section 110 that is provided on a middle of the front brake hose 60 and the front wheel cord support member 120 attached to the front joint section 110 and which supports the front wheel sensor cord 83.

The front joint section 110 includes the first front joint section 111 that is provided on a middle of the first front brake hose 61 and the second front joint section 112 that is provided on a middle of the second front brake hose 62. The first front joint section 111 has a cuboid shape having a longitudinal direction that is substantially orthogonal to a direction in which the left arm section 28 extends. The second front joint section 112 has a cuboid shape having substantially the same size as the first front joint section 111. The second front joint section 112 is arranged on the inner side in the vehicle width direction of the first front joint section 111. An outer side surface in the vehicle width direction of the second front joint section 112 is overlapped with an inner side surface in the vehicle width direction of the first front joint section 111.

The front joint section 110 is fixed to the front swing arm 25. Specifically, the front joint section 110 is fixed to the front wheel stay 130 that is fixed integrally with the front swing arm 25.

Figure 5:
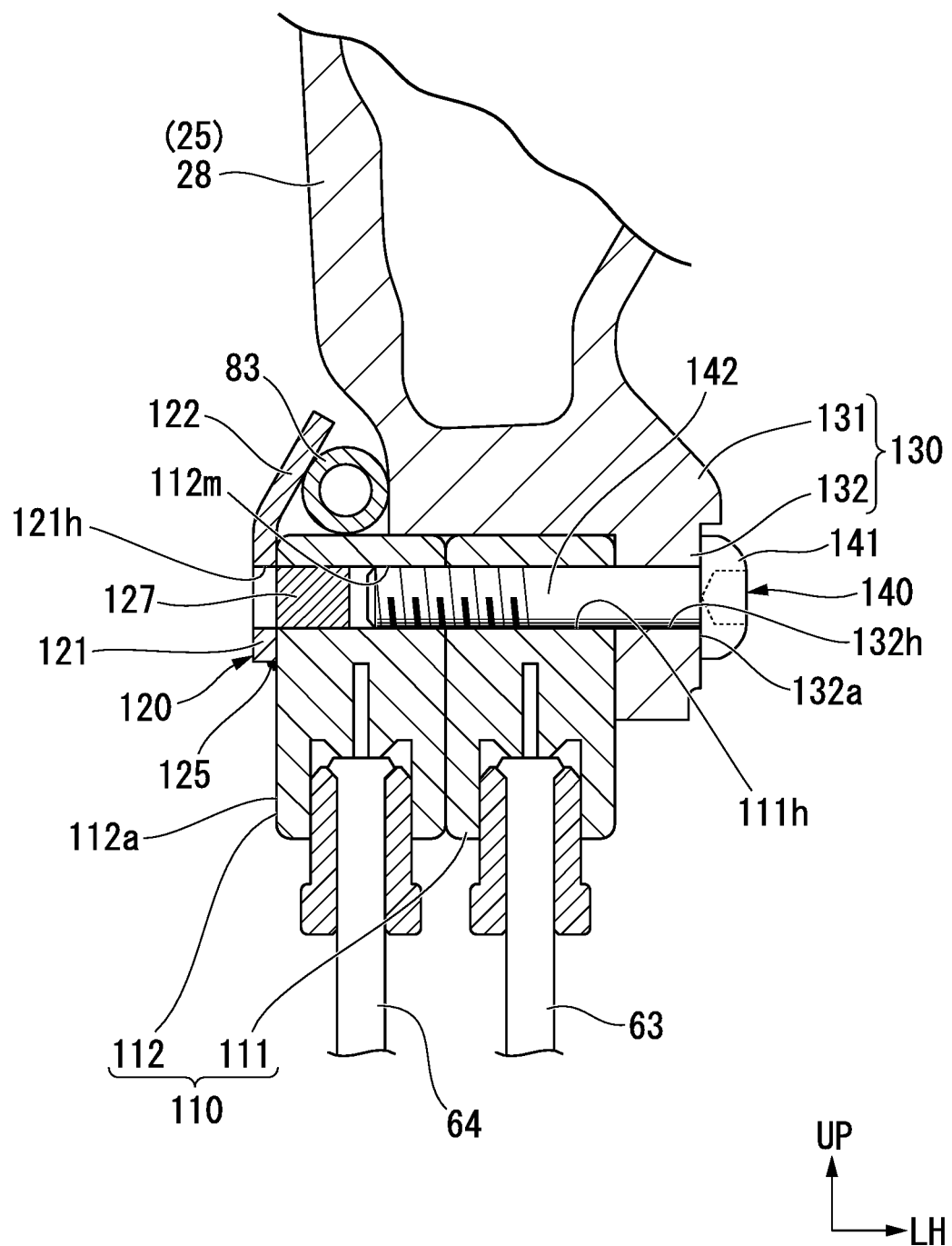
FIG. 5 is a cross-sectional view showing a fixation state of a first joint section and a second joint section in the front cable support structure.

With reference to FIG. 3 to FIG. 5, the front wheel stay 130 includes a stay base section 131 that protrudes leftward in the vehicle width direction from an upper part (specifically, an overlapped part with the front fender 33 when seen from the vehicle width direction) of the left arm section 28 and a protrusion piece 132 that is bent rearward and downward from the stay base section 131 to protrude. A seating surface section 132a having a flat surface on which a bolt head 141 can be seated is formed on the protrusion piece 132. An insertion hole 132h that opens in the vehicle width direction is formed on the seating surface section 132a of the protrusion piece 132.

With reference to both FIG. 4 and FIG. 5, a junction unit 125 that joins part of the front joint section 110 and part of the front wheel cord support member 120 in an overlapped state is provided between the front joint section 110 and the front wheel cord support member 120. The front wheel cord support member 120 is attached to the second front joint section 112. Specifically, the front wheel cord support member 120 includes a jointed section 121 being in contact with a vehicle-width-direction inner side surface 112a of the second front joint section 112 and which has a thickness in a normal direction of the vehicle-width-direction inner side surface 112a and the extension section 122 that extends from the jointed section 121 such that the front wheel sensor cord 83 is interposed between the front wheel cord support member 120 and the front swing arm 25.

An opening 121h that opens in the vehicle width direction (that is, the normal direction of the vehicle-width-direction inner side surface 112a of the second front joint section 112) is formed on the jointed section 121. The opening 121h is overlapped with the insertion hole 132h when seen from the vehicle width direction. The junction unit 125 is provided on an outer circumferential edge of the jointed section 121. The junction unit 125 is a part at which part of the second front joint section 112 and the outer circumferential edge of the jointed section 121 in the front wheel cord support member 120 are joined to each other using brazing.

With reference to both FIG. 3 and FIG. 4, a pair of grommets 126 that protect the front wheel sensor cord 83 are provided at upper and lower positions that interpose the extension section 122. The grommet 126 forms an annular shape having an inner diameter which is substantially the same as an outer diameter of the front wheel sensor cord 83. The pair of grommets 126 are arranged on the inner side in the vehicle width direction of the stay base section 131. The pair of grommets 126 are overlapped with the stay base section 131 when seen from the vehicle width direction.

With reference to both FIG. 3 and FIG. 5, the first front cable support structure 100L further includes a bolt 140 that fixes the first front joint section 111 and the second front joint section 112 in a state where the first front joint section 111 is in contact with the second front joint section 112. An inner side surface in the vehicle width direction of the first front joint section 111 and an outer side surface in the vehicle width direction of the second front joint section 112 are in contact with each other. A penetration hole 111h that opens in the vehicle width direction is formed on the first front joint section 111. A female screw portion 112m overlapped with the penetration hole 111h when seen from the vehicle width direction and which opens in the vehicle width direction is formed on the second front joint section 112.

For example, by arranging the first front joint section 111 and the second front joint section 112 in this order at the inner side in the vehicle width direction of the protrusion piece 132 of the front wheel stay 130 and screwing and fixing the bolt 140 to the female screw portion 112m of the second front joint section 112 through the insertion hole 132h of the protrusion piece 132 and the penetration hole 111h of the first front joint section 111, the first front joint section 111 and the second front joint section 112 can be fixed to the front wheel stay 130.

The length of a shaft section 142 of the bolt 140 is larger than the length obtained by adding the thickness of the protrusion piece 132 of the front wheel stay 130 to the depth of the penetration hole 111h of the first front joint section 111. The length of the shaft section 142 of the bolt 140 is smaller than the length obtained by summing the thickness of the protrusion piece 132 of the front wheel stay 130, the depth of the penetration hole 111h of the first front joint section 111, and the depth of the female screw portion 112m of the second front joint section 112. That is, in a fixed state of the second front joint section 112, a gap is formed on the inner side in the vehicle width direction of the female screw portion 112m. A closure member 127 is embedded in the gap (an inner part in the vehicle width direction of the female screw portion 112m).

<Rear Cable Support Structure>

Figure 6:
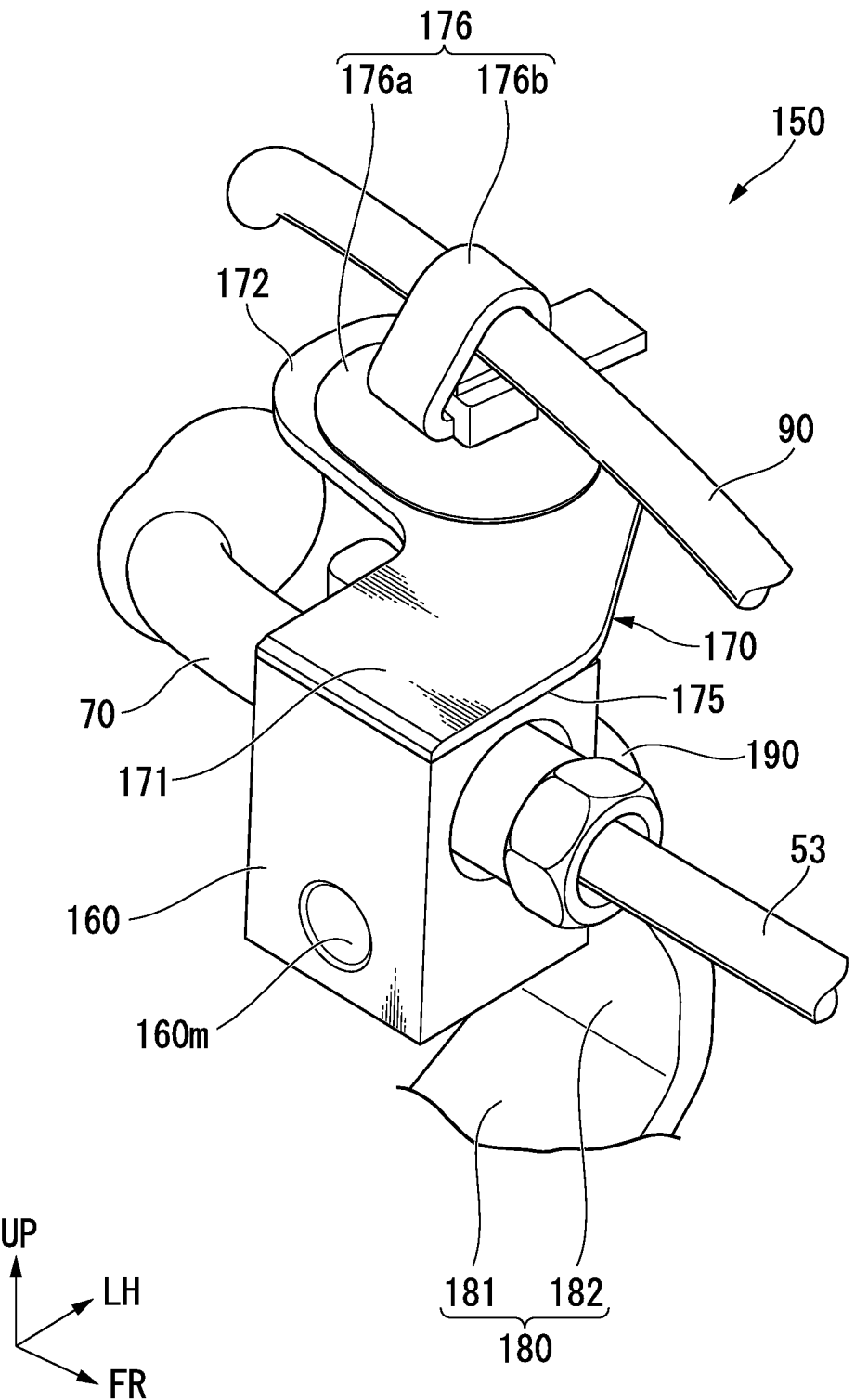
FIG. 6 is a perspective view of a rear cable support structure of the motorcycle when seen from a right front direction.

With reference to both FIG. 2 and FIG. 6, a rear cable support structure 150 includes a rear joint section 160 that is provided on a middle of the rear brake hose 70 and the rear wheel cord support member 170 attached to the rear joint section 160 and which supports a rear wheel sensor cord 90.

The rear wheel sensor cord 90 is connected between the control unit and a pickup sensor on the rear wheel side (not shown).

The rear joint section 160 has a cuboid shape having a longitudinal direction substantially in the vertical direction. The rear joint section 160 is fixed to the vehicle body frame 10. Specifically, the rear joint section 160 is fixed to a rear wheel stay 180 that is attached to the right main frame 11.

As shown in FIG. 6, the rear wheel stay 180 includes a stay base section 181 that protrudes inward in the vehicle width direction from an inner side part in the vehicle width direction of the right main frame 11 and a protrusion piece 182 that is bent upward from the stay base section 181 to protrude. An insertion hole (not shown) that opens in the vehicle width direction is formed on the protrusion piece 182.

A junction unit 175 that joins part of the rear joint section 160 and part of the rear wheel cord support member 170 in an overlapped state is provided between the rear joint section 160 and the rear wheel cord support member 170. The rear wheel cord support member 170 includes a jointed section 171 being in contact with an upper surface of the rear joint section 160 and which has a thickness in a normal direction of the upper surface and a clip attachment section 172 that extend rearward and inward in the vehicle width direction from the jointed section 171.

In a top view, the jointed section 171 is overlapped with the rear joint section 160. An external shape of the jointed section 171 has substantially the same size as an external shape (outline of the upper surface) of an upper end part of the rear joint section 160. The junction unit 175 is provided on an outer circumferential edge of the jointed section 171. The junction unit 175 is a part at which part of the rear joint section 160 and the outer circumferential edge of the jointed section 171 in the rear wheel cord support member 170 are joined to each other using brazing.

A clip 176 that supports the rear wheel sensor cord 90 is attached to the clip attachment section 172. The clip 176 includes a seating section 176a that is detachably attached to the clip attachment section 172 and a locking section 176b joined to the seating section 176a and which locks the rear wheel sensor cord 90.

The rear cable support structure 150 further includes a bolt 190 that fixes the rear joint section 160 and the protrusion piece 182 in a state where the rear joint section 160 is in contact with the protrusion piece 182. A female screw portion 160m that opens in the vehicle width direction is formed on the rear joint section 160. For example, by arranging the rear joint section 160 at the outer side in the vehicle width direction of the protrusion piece 182 and screwing and fixing the bolt 190 to the female screw portion 160m of the rear joint section 160 through the insertion hole (not shown) of the protrusion piece 182, the rear joint section 160 can be fixed to the rear wheel stay 180.

The length of a shaft section of the bolt 190 is larger than the thickness of the protrusion piece 182 of the rear wheel stay 180 and is smaller than the length obtained by adding the thickness of the protrusion piece 182 to the depth of the female screw portion 160m of the rear joint section 160. That is, in a fixed state of the rear joint section 160, a gap is formed on the outer side in the vehicle width direction of the female screw portion 160m. The gap is covered by the right main frame 11 (refer to FIG. 2) from an outward direction in the vehicle width direction.

In the above description, the front wheel 2 and the rear wheel 3 correspond to a "wheel". The front brake hose 60 and the rear brake hose 70 correspond to a "first cable (brake hose)". The front swing arm 25 and the vehicle body frame 10 correspond to a "vehicle body". The front wheel sensor cord 83 and the rear wheel sensor cord 90 correspond to a "second cable (sensor cord)". The front cable support structure 100 and the rear cable support structure 150 correspond to a "saddle-riding-type vehicle cable support structure". The front joint section 110 and the rear joint section 160 correspond to a "joint section". The front wheel cord support member 120 and the rear wheel cord support member 170 correspond to a "second cable support member". The front swing arm 25 corresponds to a "front fork". The front wheel stay 130 corresponds to a "stay". The front brake caliper 42 and the rear brake caliper 47 correspond to a "brake caliper". The front wheel master cylinder 43 corresponds to a "fluid pressure supply unit". The pickup sensor 82 corresponds to a "vehicle speed sensor". The first front brake caliper 42L corresponds to a "first brake caliper". The second front brake caliper 42R corresponds to a "second brake caliper". The first front brake hose 61 corresponds to a "first brake hose". The second front brake hose 62 corresponds to a "second brake hose". The first front joint section 111 corresponds to a "first joint section". The second front joint section 112 corresponds to a "second joint section". The bolt 140 corresponds to a "fixation member".

In the following description, the front wheel 2 and the rear wheel 3 may be simply referred to as a "wheel 2, 3". The front brake hose 60 and the rear brake hose 70 may be simply referred to as a "brake hose 60, 70". The front swing arm 25 and the vehicle body frame 10 may be simply referred to as a "vehicle body 25, 10". The front wheel sensor cord 83 and the rear wheel sensor cord 90 may be simply referred to as a "sensor cord 83, 90". The front cable support structure 100 and the rear cable support structure 150 may be simply referred to as a "cable support structure 100, 150". The front joint section 110 and the rear joint section 160 may be simply referred to as a "joint section 110, 160". The front wheel cord support member 120 and the rear wheel cord support member 170 may be simply referred to as a "cord support member 120, 170". The front brake caliper 42 and the rear brake caliper 47 may be simply referred to as a "brake caliper 42, 47".

As described above, in the above embodiment, the cable support structure 100, 150 is configured to support the brake hose 60, 70 and the sensor cord 83, 90 joined to the side part of the wheel 2, 3 and includes: the joint section 110, 160 provided on the middle of the brake hose 60, 70 and which is fixed to the vehicle body 25, 10; and the cord support member 120, 170 attached to the joint section 110, 160 and which supports the sensor cord 83, 90.

According to the configuration, the joint section 110, 160 provided on the middle of the brake hose 60, 70 and which is fixed to the vehicle body 25, 10 and the cord support member 120, 170 attached to the joint section 110, 160 and which supports the sensor cord 83, 90 are provided, and thereby, it is unnecessary to provide a dedicated clasp for supporting the brake hose 60, 70 and the sensor cord 83, 90. Accordingly, it is possible to reduce the number of components and reduce costs. Additionally, it is possible to improve the flexibility of design. For example, when the dedicated clasp is provided, a space for attaching clasp is required, and therefore, there is a possibility that design limitation may arise. Further additionally, as the joint section 110, 160 is fixed to the vehicle body 25, 10, the joint section 110, 160 is joined with high rigidity, and the cord support member 120, 170 is also joined with high rigidity. Thereby, the sensor cord 83, 90 can be supported by the cord support member 120, 170 having high rigidity, and therefore, it is possible to prevent being subject to the effect such as vibration during traveling. For example, when the brake hose and the sensor cord are supported by an elastic support member having low rigidity, there is a possibility that the brake hose and the sensor cord come into contact with each other due to vibration during traveling or the like and thereby are damaged. Specifically, when the vibration is large, there is also a possibility that the brake hose and the sensor cord may be detached from the elastic support member.

In the above embodiment, the junction unit 125, 175 that joins part of the joint section 110, 160 and part of the cord support member 120, 170 in an overlapped state is provided between the joint section 110, 160 and the cord support member 120, 170. Thereby, the joint section 110, 160 and the cord support member 120, 170 are partially overlapped with each other, and therefore, it is possible to ensure high rigidity.

In the above embodiment, the front wheel cord support member 120 includes the extension section 122 that extends such that the front wheel sensor cord 83 is interposed between the front wheel cord support member 120 and the front swing arm 25. Thereby, the front wheel sensor cord 83 can be always supported in a state where the front wheel sensor cord 83 is in contact with the front swing arm 25, and therefore, it is possible to prevent being subject to the effect such as vibration during traveling. Additionally, in a front part of the vehicle, the front brake hose 60 and the front wheel sensor cord 83 are always supported in a constant state without being subject to the effect such as vibration, and therefore, it is possible to improve the appearance.

In the above embodiment, the rear wheel cord support member 170 includes the clip attachment section 172 to which the clip 176 that supports the rear wheel sensor cord 90 is attached, and thereby, it is possible to support the rear wheel sensor cord 90 stably by the clip 176.

In the above embodiment, the joint section 110 is fixed to the front wheel stay 130 that is formed integrally with the front swing arm 25. Thereby, the joint section 110 is connected with high rigidity, and therefore, it is possible to prevent being subject to the effect such as vibration during traveling. Further, the unity of the joint section 110 and the front swing arm 25 is caused to emerge, and therefore, it is possible to improve the appearance.

In the above embodiment, the brake hose 60, 70 is a brake hose that connects the ABS module 50 and the brake caliper 42, 47 which is provided at the side part of the wheel 2, 3, and the sensor cord 83, 90 is a sensor cord that is connected to the pickup sensor 82 (a pickup sensor on the rear wheel side is not shown) which is provided at the side part of the wheel 2, 3 to thereby provide the following advantages. The cord support member 120, 170 that supports the sensor cord 83, 90 is attached to the joint section having higher rigidity than the brake hose 60, 70, and thereby, it is possible to further reliably support the sensor cord 83, 90. Additionally, in the front part of the vehicle, the sensor cord 83 can be arranged along the front swing arm 25, and therefore, it is possible to improve the appearance.

In the above embodiment, the bolt 140 that fixes the first front joint section 111 and the second front joint section 112 in a state where the first front joint section 111 is in contact with the second front joint section 112 is further provided. Thereby, it is possible to ensure high rigidity, and therefore, it is possible to prevent being subject to the effect such as vibration during traveling. Additionally, two brake hoses (that is, the first front brake hose 61 and the second front brake hose 62) are simultaneously fixed collectively, and therefore, it is possible to improve the appearance.

The above embodiment is described using an example in which the vehicle includes the front cable support structure and the rear cable support structure; however, the embodiment is not limited thereto. For example, the vehicle may include only any one of the front cable support structure and the rear cable support structure. That is, the vehicle may include at least one of the front cable support structure and the rear cable support structure.

The above embodiment is described using an example in which the rear wheel cord support member includes the clip attachment section to which the clip that supports the rear wheel sensor cord is attached; however, the embodiment is not limited thereto.

For example, the front wheel cord support member may include a clip attachment section to which a clip that supports the front wheel sensor cord is attached. In this case, the clip attachment section may be provided on the extension section. Thereby, the front wheel sensor cord can be further stably supported.

The above embodiment is described using an example in which the first cable is the brake hose and the second cable is the sensor cord; however, the embodiment is not limited thereto. For example, the first cable and the second cable may be a cable other than the brake hose and the sensor cord. That is, the first cable and the second cable may be a cable joined at least to the side part of the wheel.

The above embodiment is described using an example in which the front fork is the front swing arm that forms a front suspension mechanism; however, the embodiment is not limited thereto. For example, the front fork may be a telescopic-type front fork suspension (front fork).

The above embodiment is described using an example in which the front joint section includes the first front joint section and the second front joint section (two joint sections); however, the embodiment is not limited thereto. For example, the front joint section may include only one joint section. The rear joint section may include two joint sections.

The above embodiment is described using an example in which the fluid pressure supply unit is the master cylinder; however, the embodiment is not limited thereto. For example, the fluid pressure supply unit may be a fluid pressure supply mechanism other than the master cylinder such as an oil hydraulic cylinder. That is, the fluid pressure supply unit may supply a brake pressure to the brake caliper.

The above embodiment is described using an example in which the brake hose is a brake hose that connects the brake caliper and the master cylinder via the ABS module; however, the embodiment is not limited thereto. For example, the brake hose may be a brake hose that connects the brake caliper and the fluid pressure supply unit via no ABS module.

The above embodiment is described using an example in which the rear joint section is fixed to the main frame; however, the embodiment is not limited thereto. For example, the rear joint section may be fixed to the lower frame or the pivot plate. That is, the rear joint section may be fixed to the vehicle body frame.

The above embodiment is described using an example in which the fixation member is the bolt; however, the embodiment is not limited thereto. For example, the fixation member may be another member such as a rivet. That is, the fixation member may fix the first joint section and the second joint section in a state where the first joint section is in contact with the second joint section.

The above embodiment is described using an example in which the engine is a horizontal multicylinder engine; however, the embodiment is not limited thereto. For example, the engine may be a parallel multicylinder engine or a single cylinder engine. That is, a variety of engine forms can be adopted.

The present invention is not limited to the embodiments described above. For example, the saddle riding type vehicle includes all vehicles on which a driver rides so as to straddle the vehicle body. The saddle riding type vehicle includes not only a motorcycle (including a motorized bicycle and a scooter-type vehicle) but also a three-wheeled vehicle (including a vehicle having two front wheels and one rear wheel in addition to a vehicle having one front wheel and two rear wheels). Further, the present invention is applicable to not only a motorcycle but also a four-wheel vehicle such as an automobile.

The configuration in the embodiments described above is an example of the invention, and various changes such as substitution of the configuration element of the embodiments by a known configuration element can be made without departing from the scope of the invention.

What is claimed is:

1. A saddle-riding vehicle cable support structure configured to support a first cable and a second cable, the cable support structure comprising:
   a joint section provided on a middle of the first cable and which is fixed to a vehicle body; and
   a second cable support member attached to the joint section and which supports the second cable,
   wherein the first cable is a brake hose that connects a brake caliper and a fluid pressure supply unit or an ABS module,
   wherein the second cable is a sensor cord that is connected to a vehicle speed sensor, wherein the brake caliper includes a first brake caliper that is provided on one side of the wheel in a vehicle width direction and a second brake caliper that is provided on the other side of the wheel in the vehicle width direction, wherein the brake hose includes a first brake hose that connects the first brake caliper and the fluid pressure supply unit or the ABS module and a second brake hose that connects the first brake caliper and the second brake caliper, wherein the joint section includes a first joint section that is provided on a middle of the first brake hose and a second joint section that is provided on a middle of the second brake hose, wherein the second cable support member is attached to any one of the first joint section and the second joint section, and wherein a fixation member that fixes the first joint section and the second joint section in a state where the first joint section is in contact with the second joint section is further provided.

2. The saddle-riding vehicle cable support structure according to claim 1, wherein a junction that joins together part of the joint section and part of the second cable support member in an overlapped state is provided between the joint section and the second cable support member.

3. The saddle-riding vehicle cable support structure according to claim 1, wherein the second cable support member includes an extension section that extends such that the second cable is interposed between the second cable support member and the vehicle body.

4. The saddle-riding vehicle cable support structure according to claim 1, wherein the joint section is fixed to a stay that is formed integrally with a front fork.

* * * * *